US005986240A

United States Patent [19]

Schmitt et al.

[11] Patent Number: 5,986,240

[45] Date of Patent: Nov. 16, 1999

[54] METHOD AND APPARATUS FOR MAINTAINING CONTENTS OF A COMPRESSED GAS CYLINDER AT A DESIRED TEMPERATURE

[75] Inventors: Robert D. Schmitt; Durwin A. Schmitt, both of Littleton, Colo.; William C. Russo, Neshanic Station, N.J.; Roberto J. Sweeney, New Tripoli, Pa.

[73] Assignee: MG Industries, Malvern, Pa.

[21] Appl. No.: 09/003,227

[22] Filed: Jan. 6, 1998

[51] Int. Cl.[6] ........ A21B 1/00

[52] U.S. Cl. ........ 219/391

[58] Field of Search ........ 219/391, 201, 219/214, 218, 385, 386, 408, 529; 434/219; 206/0.6

[56] References Cited

U.S. PATENT DOCUMENTS

| | | |
|---|---|---|
| 4,303,731 | 12/1981 | Torobin . |
| 4,531,398 | 7/1985 | DiBenedetto et al. . |
| 4,566,589 | 1/1986 | Poschinger . |
| 4,660,714 | 4/1987 | Suzuki et al. . |
| 4,905,855 | 3/1990 | Troiano et al. . |
| 5,197,595 | 3/1993 | Coultas . |
| 5,641,005 | 6/1997 | Kountz et al. . |
| 5,679,003 | 10/1997 | Schwechel ........ 434/219 |
| 5,761,911 | 6/1998 | Jurcik et al. ........ 62/50.2 |

*Primary Examiner*—Teresa Walberg
*Assistant Examiner*—Krishan Pasrija
*Attorney, Agent, or Firm*—William H. Filberg

[57] ABSTRACT

A cabinet, sized to accommodate a compressed gas cylinder, includes a heater which maintains the contents of the cylinder within a desired temperature range. By heating the air surrounding the cylinder, the heater heats not only the cylinder but also its valve and regulator. Vent holes, placed near the top and bottom of the cabinet, provide continuous air flow, preventing possible accumulation of flammable gas in the cabinet in the event of a cylinder leak. The invention is especially useful in maintaining a calibration gas at a temperature which insures the stability of the components of the gas. The invention can also be used in any situation in which it is necessary to heat a compressed gas cylinder.

4 Claims, 3 Drawing Sheets

METHOD AND APPARATUS FOR MAINTAINING CONTENTS OF A COMPRESSED GAS CYLINDER AT A DESIRED TEMPERATURE

BACKGROUND OF THE INVENTION

This invention relates to compressed gas cylinders, and provides a method and apparatus for maintaining the contents of such cylinders at a desired temperature. The invention is especially useful with cylinders that contain calibration gas mixtures.

A calibration gas is a gas mixture which contains a plurality of components in known proportions. A calibration gas may be used to calibrate gas analyzers or the like. By passing the calibration gas through a gas analyzer, and observing the readings taken from the analyzer, one can adjust the analyzer so that it indicates the correct proportion of each component in the mixture. Typically, a calibration gas is provided in a compressed gas cylinder.

In order to serve its intended purpose, all of the components of a calibration gas must remain gaseous. If the cylinder containing the calibration gas is allowed to become too cold, some of the components of the gas can condense, rendering the mixture useless for calibration.

The problem of exposure of a gas cylinder to cold temperatures is not great in the laboratory, but can be serious in the field. For example, in the operation of gas pipelines, it is necessary to monitor the composition of the gas stream, and thus calibration gases are needed to insure the accuracy of the gas analyzers used. But such pipelines typically extend through remote and cold areas. Keeping a calibration gas cylinder in such remote areas, especially outdoors, without protection, could render the calibration gas useless.

One solution that has been proposed, to solve the above-described problem, is to wrap the cylinder in a special heating blanket. While the latter achieves the result of keeping the cylinder warm, it is cumbersome to affix the blanket to the cylinder, and in places where the ambient temperatures are very cold, the blanket is relatively inefficient. Moreover, it may present a safety hazard by applying heat directly to the cylinder, since many calibration gases are flammable, and gas cylinders can occasionally leak. Also, a heating blanket generally provides no means for heating the cylinder valve and regulator. Thus, even if the cylinder is adequately heated by a blanket, the contents of the cylinder may be cooled again when they pass through the unheated valve and regulator.

The present invention solves the problems described above, by providing a safe and economical apparatus and method for maintaining the contents of a compressed gas cylinder at a desired temperature.

SUMMARY OF THE INVENTION

The apparatus of the invention comprises a cabinet which includes a housing and a door connected to the housing. The cabinet is preferably rectangular, and is sized to accommodate a compressed gas cylinder. The cabinet includes a heater means, preferably disposed within a cage to prevent direct contact between the cylinder and a heater element. In the preferred embodiment, there are two air vents, one near the top of the cabinet, and one near the bottom, to allow air to flow continuously into and out of the cabinet. The door of the cabinet can also have a window for viewing the cylinder from the outside.

In practicing the method of the present invention, one simply opens the door of the cabinet, inserts the compressed gas cylinder, and closes the door. A safety strap may be fastened around the cylinder to prevent it from moving if the cabinet is disturbed. One then activates the heater, thereby heating the air surrounding the cylinder. The cylinder and its contents are thus brought to, and maintained at, a desired temperature range. An internal thermostat controls the output of the heater, and thus maintains the contents of the cylinder within the desired temperature range.

The present invention therefore has the primary object of providing an apparatus for maintaining the contents of a compressed gas cylinder within a desired temperature range.

The invention has the further object of providing a method for maintaining the contents of a compressed gas cylinder within a desired temperature range.

The invention has the further object of protecting the integrity of calibration gas mixtures by insuring that their components do not condense.

The invention has the further object of maintaining the contents of a compressed gas cylinder within a desired temperature range, without allowing the cylinder to be in direct contact with a source of heat.

The invention has the further object of heating a compressed gas cylinder, while also heating the cylinder valve and regulator at the same time.

The invention has the further object of enabling compressed gas cylinders to be heated safely and economically in cold and remote areas.

The reader skilled in the art will recognize other objects and advantages of the present invention, from a reading of the following brief description of the drawings, the detailed description of the invention, and the appended claims.

DETAILED DESCRIPTION OF THE INVENTION

Figure 1:
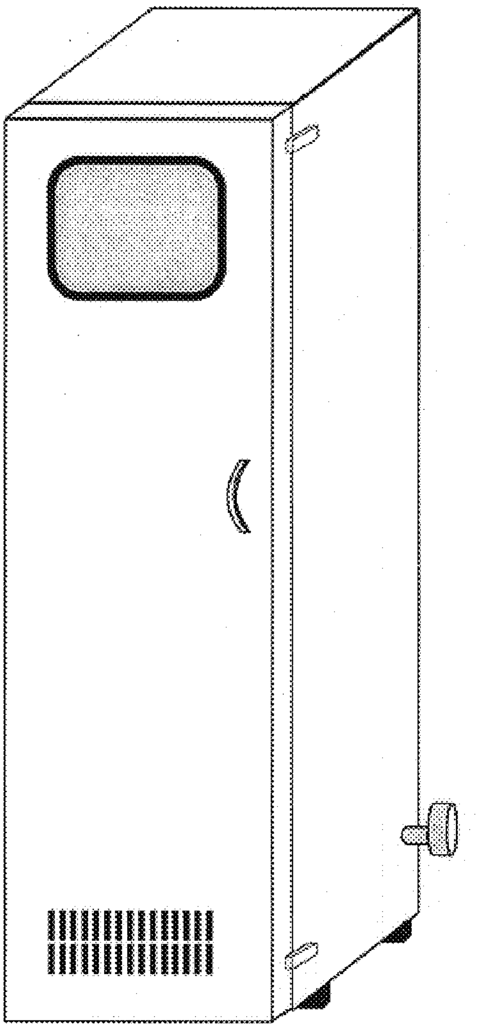
FIG. 1 provides a perspective view of the apparatus of the present invention.

FIG. 1 provides a perspective view of the apparatus of the present invention. The apparatus comprises a cabinet formed of a housing 1 and a door 3 attached to the housing. Handle 5 facilitates the opening of the door, and window 7 enables one to monitor a gas cylinder (not shown in FIG. 1) within the cabinet, without opening the door. In the preferred embodiment, there is a perforated plate 9, the plate having a plurality of rectangular vent holes. Plate 9 is located near the bottom of the door. Connector 11 enables one to connect the heater disposed inside the housing (not visible in FIG. 1) to an external source of power.

Figure 2:
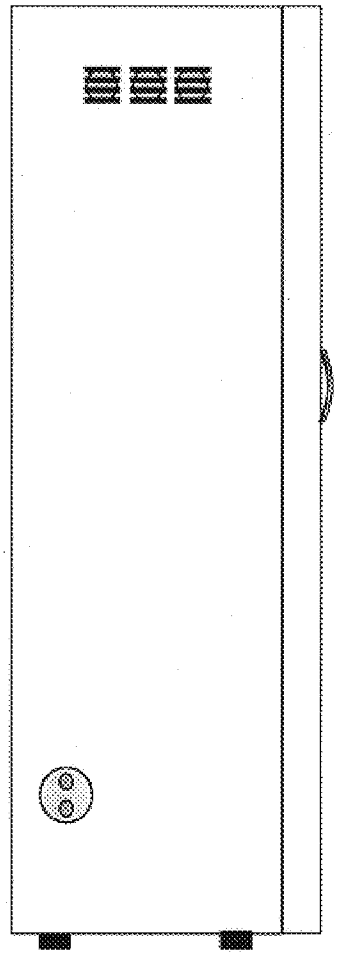
FIG. 2 provides a side elevational view of the apparatus of the present invention.

FIG. 2 provides a side elevational view of the cabinet. This side view shows louvers 14, formed near the top of housing 1. The louvers cover a plurality of vent holes which are not visible in FIG. 2.

Figure 3:
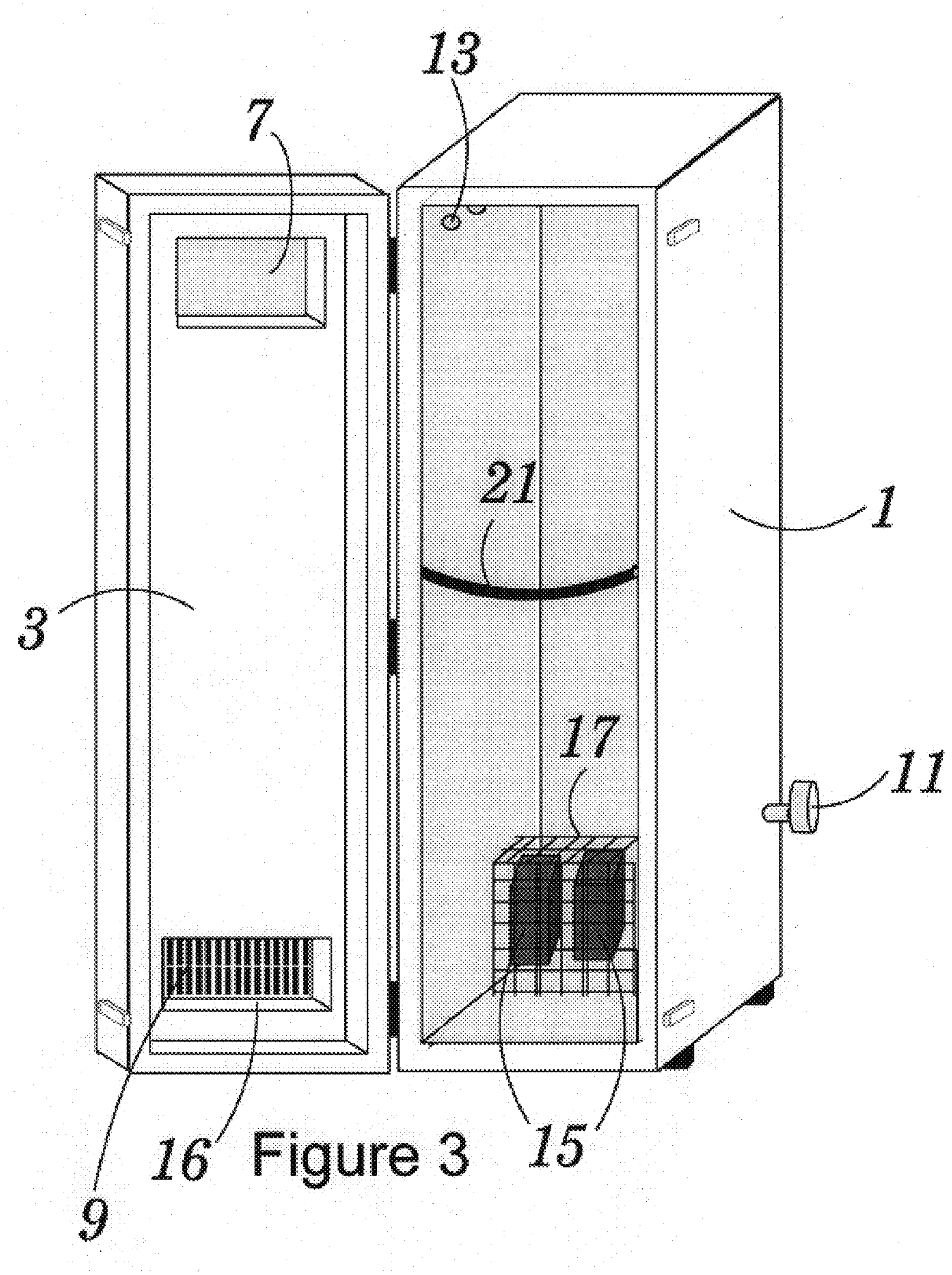
FIG. 3 provides a perspective view of the apparatus of the present invention, showing the door in the open position, and showing the position of the heater located inside the housing.

FIG. 3 provides a perspective view of the apparatus, showing the door open. In FIG. 3, one can see two of the vent holes 13 disposed near the top of the housing 1. FIG. 3 also shows heaters 15 disposed within the cabinet. The heaters, which may be electric resistance heaters, are preferably located within cage 17, which prevents the cylinder from directly touching the heaters. Such direct contact is considered hazardous and therefore not desirable, in part because the contents of the cylinder may be flammable, and cylinders may occasionally leak. Indeed, an object of the present invention is to heat the cylinder without applying heat directly to it. Instead, the present invention heats the air surrounding the cylinder, which in turn heats the cylinder, keeping its contents at a temperature within a desired range.

FIG. 3 also shows safety strap 21, located inside the cabinet. The safety strap keeps the cylinder secure, and provides an added margin of safety in the event that the cabinet is bumped by external equipment, by preventing the cylinder from tipping over.

Figure 4:
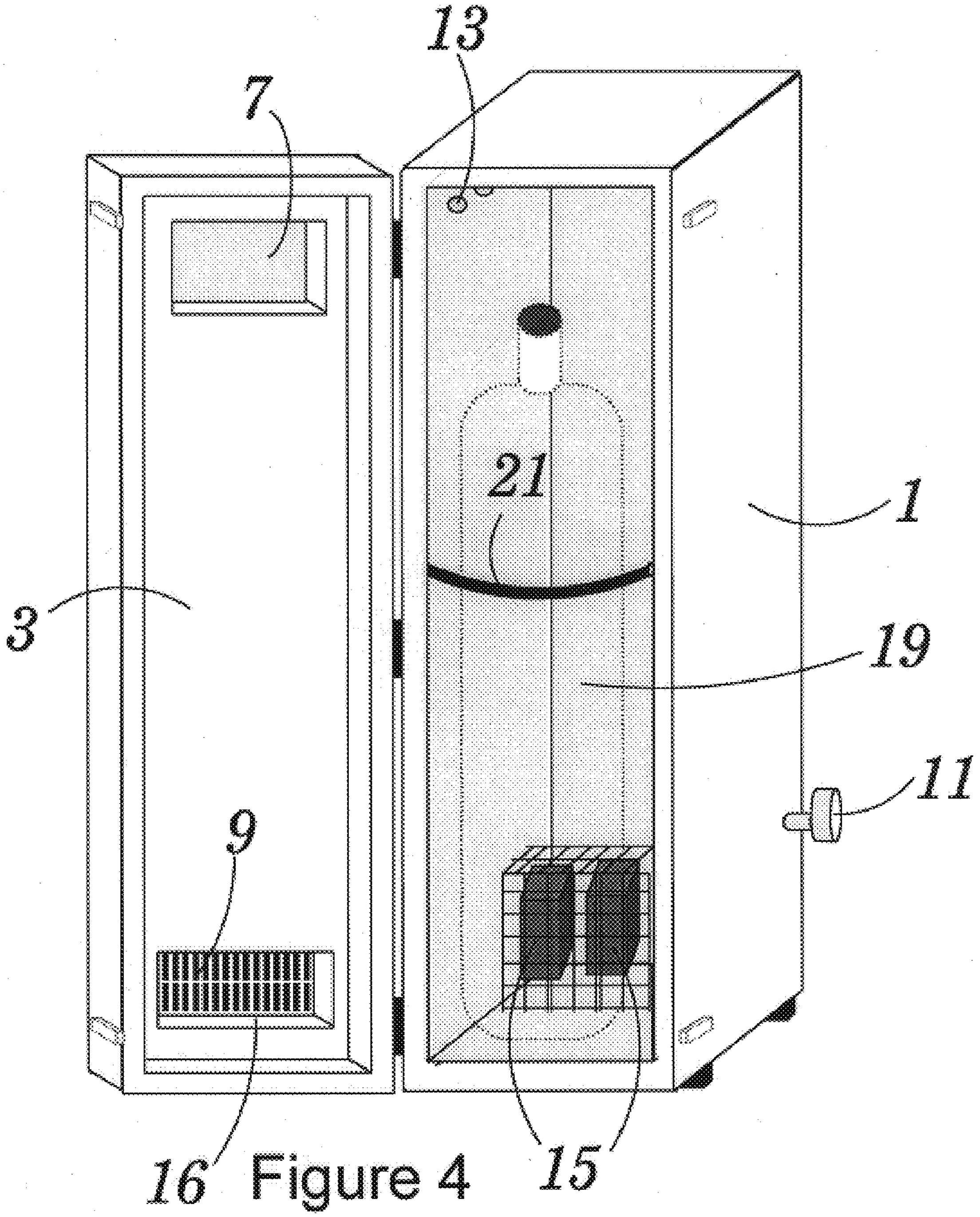
FIG. 4 provides a perspective view similar to that of FIG. 3, but showing a compressed gas cylinder, in dotted outline, located within the housing.

FIG. 4 provides a view similar to that of FIG. 3, except that it also shows compressed gas cylinder 19, in dotted outline, within the cabinet. FIG. 4 shows how the housing is designed so that it will fit reasonably closely around a compressed gas cylinder.

In one preferred embodiment, the housing may have a height of about 68 inches, a width of about 19 inches, and a depth of about 23 inches. These figures are given only by way of example, and should not be deemed to limit the invention in any way.

FIGS. 3 and 4 also show the rectangular opening 16, formed near the bottom of the door. In the preferred embodiment, the total area of the vent holes in perforated plate 9 is about 8.75 square inches. The vent holes formed near the top of the cabinet are preferably circular, each having a diameter of one inch. Again, these dimensions are exemplary and not limiting, as other optimal arrangements may exist. The invention should not be deemed limited by any particular set of dimensions.

The sizing and placement of the vent holes are important, because the cabinet is preferably self-venting. That is, there should be a constant flow of air through the cabinet to prevent formation of a flammable atmosphere therein, in the event of a leak in the cylinder. The apparatus is intended to maintain the contents of the cylinder within a particular temperature range, which may be around 100° F., and this temperature should be maintained despite a wide variation in temperature outside the cabinet. The configurations of the vent holes were optimized by conducting experiments using a variety of vent hole arrangements. The optimum result was obtained by placing the inlet vent in the bottom of the cabinet, i.e. on the bottom of the door as shown, and by placing the outlet vent in the upper left-hand side of the housing. The optimum size of the vents was determined by conducting controlled experiments that produced constant air flow through the chamber while maintaining the average temperature inside the cabinet within a desired range. It was determined that to maintain these optimum conditions, the vent area at the bottom of the chamber should be greater than that at the top. The preferred ratio of the vent area at the bottom to the vent area at the top is about 3 to 1.

In the preferred embodiment, the cabinet is made of a rigid, highly-compressed foam material, the foam material being covered with a white aluminum cladding. The foam provides thermal insulation which minimizes the loss of heat to the outside environment. Also, the use of foam minimizes the weight of the cabinet, making it easier to transport. The aluminum cladding protects the foam structure from ultra-violet light, from weather, and from absorption of solar radiation when the unit is located outdoors. Although the preferred material for the cabinet is foam, the invention should not be deemed limited to a particular material. Also, the aluminum cladding could be omitted, within the scope of the invention.

It is preferable to provide a grounding strap (not shown) which grounds the cabinet from the outside. Grounding is especially important when a flammable gas is stored in the cylinder.

The present invention has the advantage that it heats not only the contents of the cylinder, but also the cylinder valve and regulator. The latter is true because the entire cylinder is located within the cabinet, wherein the air is heated. Thus, the cylinder, the cylinder valve, and the regulator will all be maintained within the desired average temperature range. Gas passing through the valve and regulator will thus also remain within the desired average temperature range.

The interior of the cabinet may be provided with an insulating lining, so as to reflect much or most of the radiated heat, from the heaters, back to the cylinder.

In operation of the invention, one opens the door of the cabinet, and inserts the cylinder. A gas line may then be attached to the pressure regulator on the cylinder. The gas line is typically installed through a hole (not shown) provided in the wall of the cabinet, which hole can be easily drilled since, as noted above, the cabinet wall is preferably made of foam which is easily penetrated. One then closes the door, and activates the heaters. In the preferred embodiment, the heaters include thermostatic controls which automatically bring the temperature inside the cabinet to a desired range, which may be about 100° F. The heaters also preferably include a high-temperature cut-off switch which will shut down the heaters if the temperature in the chamber exceeds a predetermined setting.

In an alternative embodiment, one could provide an external thermostat (not shown), which could be mounted on the door or the housing, which thermostat could be used to set a desired temperature inside the housing. Regardless of whether the thermostat is manually controllable, the apparatus keeps the contents of the cylinder at a desired temperature, thereby insuring the stability of the gaseous components.

The use of the invention is not limited to maintaining a calibration gas at a desired temperature. It can also be used in any application in which it is desirable to heat a gas cylinder. For example, the apparatus can be used to heat most liquefied gases such as chlorine, hydrogen chloride, sulfur hexafluoride, sulfur dioxide, carbon dioxide, and others.

While the invention has been described with respect to certain preferred embodiments, other variations are possible. For example, the number of heaters within the cabinet can be varied, as can the configuration of the window and other components. Other configurations of vent holes may also be used. The size of the cabinet can be modified so that it will accept a cylinder having a different size. Also, the cabinet could be further modified to accommodate multiple cylinders, having the same or different sizes. These and other modifications, which will be apparent to the reader skilled in the art, should be deemed within the spirit and scope of the following claims.

What is claimed is:

1. A method of maintaining a composition of a calibration gas, the calibration gas having a plurality of components, all of the components of the calibration gas being in a gaseous state and being present in known proportions, the method comprising:

a) providing the calibration gas in a gas cylinder at a location where the cylinder is naturally exposed to temperatures sufficiently low to cause condensation of some of said components of the gas, b) placing the cylinder in a cabinet, the cabinet having means for heating the cylinder without direct contact with the cylinder, and c) operating the heating means so as to maintain the calibration gas in the cylinder at a temperature above ambient temperature, wherein all of the components of the calibration gas remain in a gaseous state regardless of ambient temperatures outside the cabinet.

2. The method of claim 1, wherein step (c) comprises maintaining the calibration gas at a temperature of about 100° F.

3. The method of claim 1, further comprising the step of using the calibration gas to calibrate a gas analyzer.

4. The method of claim 2, further comprising the step of using the calibration gas to calibrate a gas analyzer.

* * * * *